United States Patent
Birsching

(10) Patent No.: US 9,471,067 B2
(45) Date of Patent: Oct. 18, 2016

(54) PRESSURE SENSOR AUTOTRIM ALGORITHM

(71) Applicant: Steering Solutions IP Holding Corporation, Saginaw, MI (US)

(72) Inventor: Joel E. Birsching, Vassar, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 72 days.

(21) Appl. No.: 14/528,546

(22) Filed: Oct. 30, 2014

(65) Prior Publication Data

US 2016/0124442 A1 May 5, 2016

(51) Int. Cl.
| | |
|---|---|
| *G05D 16/20* | (2006.01) |
| *B62D 5/06* | (2006.01) |
| *B62D 5/065* | (2006.01) |
| *F15B 19/00* | (2006.01) |
| *G01D 18/00* | (2006.01) |

(52) U.S. Cl.
CPC .............. *G05D 16/20* (2013.01); *B62D 5/062* (2013.01); *B62D 5/065* (2013.01); *F15B 19/002* (2013.01); *G01D 18/004* (2013.01)

(58) Field of Classification Search
CPC ...... G05D 16/20; B62D 5/062; B62D 5/065; F15B 19/002; G01D 18/004
See application file for complete search history.

(56) References Cited

U.S. PATENT DOCUMENTS 5,224,564 A * 7/1993 Duffy .................... B62D 5/065
180/422

* cited by examiner

*Primary Examiner* — Russell Frejd
(74) *Attorney, Agent, or Firm* — Cantor Colburn LLP

(57) ABSTRACT

A hydraulic steering system estimates a trim value from at least a backpressure sensed on a valve assembly in a steering gear. The system further applies the trim value to the pressure measurements of the valve assembly in the steering gear.

16 Claims, 5 Drawing Sheets

PRESSURE SENSOR AUTOTRIM ALGORITHM

BACKGROUND OF THE INVENTION

The invention generally relates to pressure compensation in a hydraulic steering system.

Conventional hydraulic steering systems use a power steering pump to provide pressurized hydraulic fluid to a steering gear. As a driver applies an increasing level of torque to a steering valve integrated in the steering gear, the power steering pump responds by increasing hydraulic pressure on the steering gear. A magnetic torque overlay system was has been developed that incorporates a magnetic actuator into the valve assembly.

The magnetic actuator in the valve assembly provides further potential for controlling the hydraulic system through additional automated algorithms. Implementation of these additional algorithms requires the steering pressure to accurately represent the torque applied by the driver. Present solutions require close matching of components within the pressure sensor channels which can increase the time of calibration of a hydraulic system.

Accordingly, it is desirable to calibrate the pressure sensor without matching pressure channels at the time of assembly or manufacture.

SUMMARY OF THE INVENTION

According to one aspect of the invention, the system includes a hydraulic steering system that includes an estimation module that estimates a trim value from at least a backpressure sensed on a valve assembly in a steering gear. The system further includes a compensation module that applies the trim value to pressure measurements on the valve assembly in the steering gear.

According to another aspect of the invention, a method of compensating pressure in a hydraulic steering system includes determining a first pressure value and a second pressure value from a pressure sensor connected to opposing sides of a valve assembly operatively connected to opposing sides of a piston. The method further includes selecting an instantaneous backpressure value from the first pressure value and the second pressure value, determining a difference value by subtracting the instantaneous backpressure value from an average backpressure value, and compensating a subsequent first pressure and a subsequent second pressure based at least in part on a trim value calculated with the difference value.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
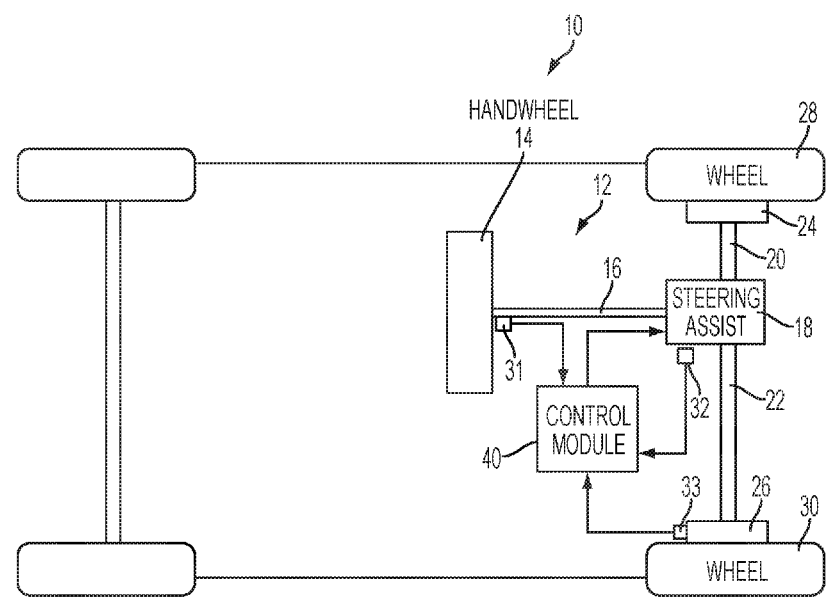
FIG. 1 is a block diagram of a vehicle including a hydraulic power steering control system in accordance with an exemplary embodiment of the invention.

Referring now to the Figures, where the invention will be described with reference to specific embodiments, without limiting same, and specifically referring to FIG. 1, where the invention will be described with reference to specific embodiments without limiting the same, an exemplary embodiment of a vehicle 10 including a steering system 12 is illustrated. In various embodiments, the steering system 12 includes a handwheel 14 coupled to a steering shaft 16.

As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned to similarly control road wheel disturbance at the handwheel based on wheel speed signals.

In one exemplary embodiment, the steering system is hydraulic steering system that further includes a steering assist unit 18. The steering assist unit 18 couples the steering shaft 16 of the steering system 12 to tie rods 20, 22 of the vehicle 10. The steering assist unit 18 includes, for example, a rack and pinion steering mechanism (not shown) that may be coupled through the steering shaft 16 to a steering actuator motor and gearing.

During operation, as the handwheel 14 is turned by a vehicle operator, a valve assembly is magnetically actuated, creating pressure on a piston within the steering assist unit 18. The magnetic actuator varies the torque required to move the tie rods 20, 22. The movement of the tie rods 20, 22 turns steering knuckles 24, 26, respectively, coupled to roadway wheels 28, 30, respectively of the vehicle 10.

The vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a steering wheel angle sensor that senses the angle applied to the handwheel 14 by the operator of the vehicle 10. The angle sensor generates a hand wheel angle signal based thereon. In another example, the sensor 32 is a pressure sensor that measures hydraulic pressure in the steering assist unit 18. The sensor 32 generates a pressure value based thereon. In yet another example, the sensor 33 is a vehicle speed sensor that senses a rotational speed of the wheel 30. The sensor 33 generates a vehicle speed signal based thereon.

A control module 40 controls the operation of the steering system 12 based on one of more of the sensor signals and further based on the steering control systems and methods of the subject disclosure. Generally, the steering control systems and method of the present disclosure determine a pressure adjustment value or trim value, and add the trim value during a turn to normalize any bias existing in the steering system.

Figure 2:
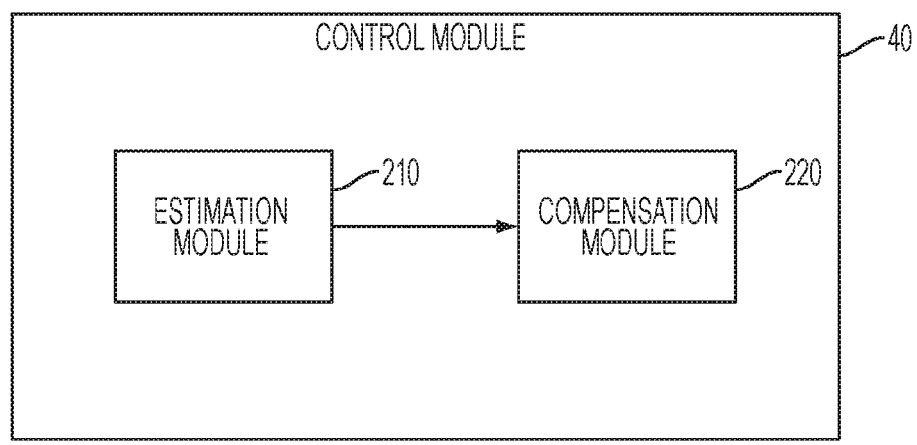
FIG. 2 is a simplified block diagram according to one embodiment of a control module of the invention.

Turning to FIG. 2, an overview of the control module 40 is shown. In particular, the control module comprises an estimation module 210 that estimates a trim value from pressures sensed on a valve assembly or piston. The trim value is then applied by a compensation module 220 as described in more detail below.

The estimation module 210 monitors data from the sensor 32 described above. Sensor 32 acquires pressure data from at least two pressure channels connected to opposing turn sides of a piston. The pressure sensor 32 monitors the opposing turn sides simultaneously and transmits pressure measurements to the estimation module 210 in at least one frequency.

The pressure measurements transmitted by the pressure sensor 32 is sampled and interpreted by the estimation module 210. From the pressure measurements, the estimation module computes a first pressure on a first side of piston and a second pressure on a second side of the piston. The first pressure and the second pressure are instantaneous readings of pressure on each channel at a given point in time.

The estimation module 210 then evaluates the first pressure and the second pressure to determine a backpressure value from the first pressure and the second pressure. Typically, a backpressure value is a pressure value on a channel that is lower in magnitude than the pressure on the opposing channel. Backpressure results from a pressure on the piston created by downstream restrictions which include (but are not limited to) return hoses and reservoir pressure.

Of the first pressure value and the second pressure value, the estimation module 210 determines that the pressure value lower in magnitude represents an instantaneous backpressure value. The estimation module 210 additionally determines that the pressure value greater in magnitude is an instantaneous system pressure value. If the magnitudes of the first pressure value and the second pressure value are equal, the estimation module 210 can randomly choose an instantaneous backpressure value from the first pressure value and the second pressure value, for example.

The estimation module then subtracts the instantaneous backpressure value from an average backpressure value to determine a difference value. The average backpressure value is calculated over time during previous samples of instantaneous backpressure values acquired during piston movement from the at least two channels. The difference value, which is a difference between the instantaneous backpressure value and the average backpressure value, represents an error margin at a given time.

The estimation module additionally evaluates the magnitude of the difference value. The difference value is integrated over time to determine the trim value.

The estimation module outputs the trim value to the compensation module 220 of the control module 40. The trim value is applied by the compensation module 220 to pressure measurements including a subsequent instantaneous backpressure value and a subsequent instantaneous system pressure value. Both the subsequent instantaneous backpressure value and the subsequent instantaneous system pressure value are adjusted by the trim value depending on their relationship to the average backpressure value.

In particular, the compensation module 220 adds the trim value to the subsequent instantaneous backpressure value if the magnitude of the instantaneous backpressure value is less than the magnitude of the average backpressure value. Alternatively, the compensation module subtracts the trim value from a subsequent instantaneous backpressure value if the magnitude of the instantaneous backpressure value is greater than the magnitude of average backpressure value.

The compensation module 220 repeats via a control loop for subsequent instantaneous backpressure values until the instantaneous backpressure value is within a suitable predetermined margin of error. To this end, the compensation module continues to compensate the backpressure and system pressure values with the trim value until the difference between the instantaneous backpressure value and the average backpressure value is within a predetermined limit. When the predetermined limit is reached, subsequent instantaneous backpressure values will converge toward the average backpressure value.

Figure 3:
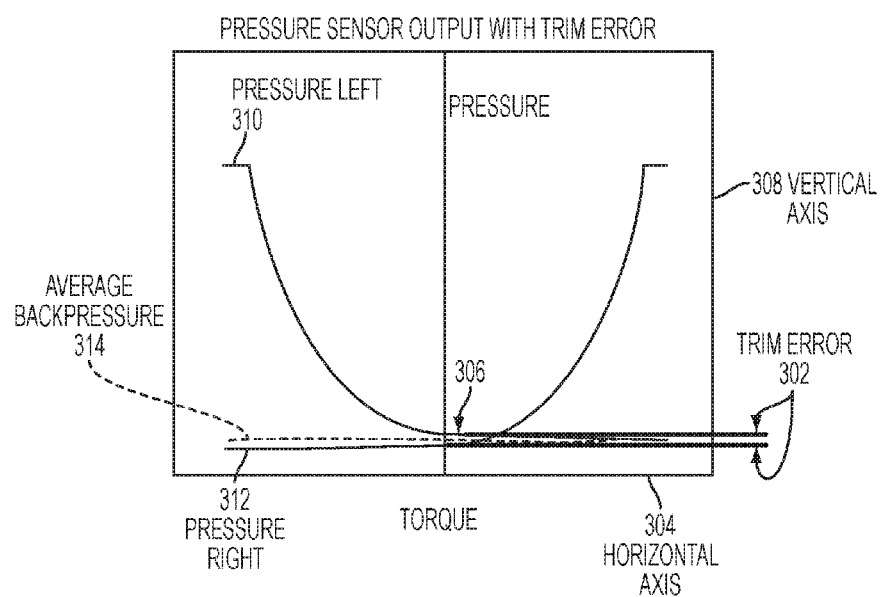
FIG. 3 is a graphical representation of a pressure sensor output in accordance with the invention.

FIG. 3 illustrates a trim error 302 between sensor channels. The trim error 302 creates an undesirable bias that can affect the steering feel of a vehicle operator while operating the handwheel 14. In this illustration, the horizontal axis 304 represents torque applied to the steering system by the handwheel 14. The center point 306 of the horizontal axis 304 represents a neutral position where no torque is applied to valve assembly. The vertical axis 308 represents pressure values. When the handwheel is turned counterclockwise from a beginning neutral position, the pressure value represented by the left curve 310 increases in value. The pressure value shown by pressure right 312 remains approximately constant when the handwheel is turned counterclockwise from a beginning neutral position. The average backpressure is represented by the dashed line 314.

Figure 4:
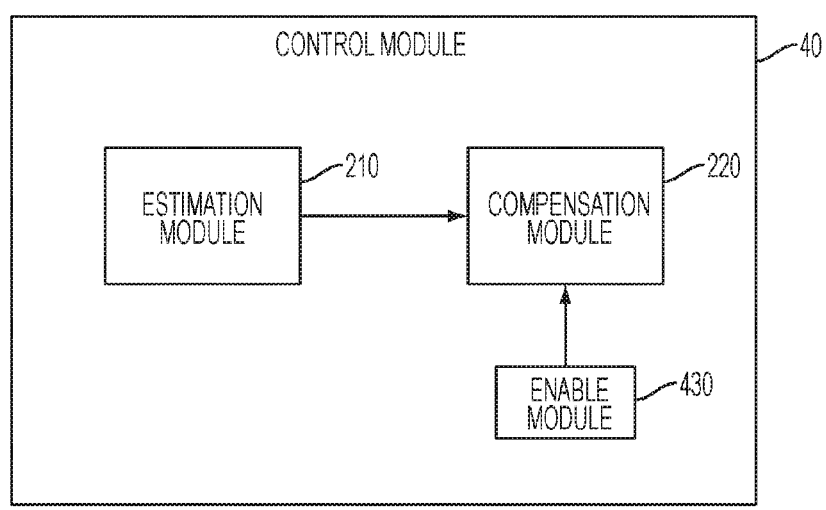
FIG. 4 is a simplified block diagram according to one embodiment of a control module of the invention.

Turning to FIG. 4, the control module 40 optionally comprises an enable module 430 that selectively activates the estimation module 210 and/or compensation module 220 depending on the presence of certain predetermined conditions.

In one example, the enable module 430 may only allow the estimation module to update the average backpressure value when system pressure is lower than a predetermined value and when rotations per minute (RPM) of the engine are greater than a base rotation value.

In another example, the enable module 430 may only enable the compensation module 220 to apply the trim value when the average backpressure value is less than the magnitude of the system pressure value but greater than an instantaneous backpressure value. The average backpressure value may be computed using any average method, such as integrating a difference value.

The enable module 430 also determines a calibratable rate that is provided to the estimation module. The estimation module uses the calibratable rate to integrate the trim value.

Figure 5:
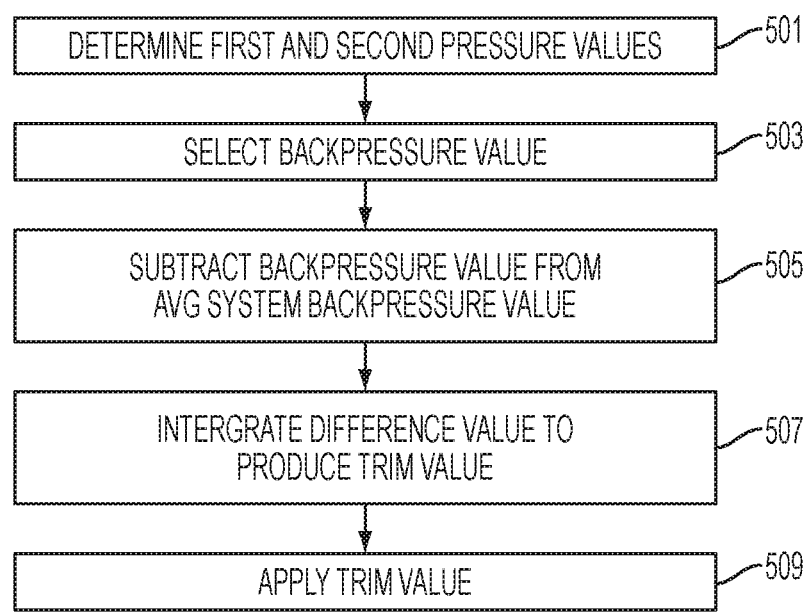
FIG. 5 is a method in accordance with another embodiment of the invention.

FIG. 5 illustrates a method in accordance with the subject application. At step 501, a first pressure value and a second pressure value are determined. The first pressure value and pressure sensor value are pressure values sensed by opposing sides of a piston or valve assembly. At step 503, a backpressure value is selected from the first pressure value and the second pressure value. Typically, the backpressure value will be the value that is lower in magnitude. At step 505, the backpressure value is subtracted from an average back pressure value to create a difference value. The difference value relates to an error between the pressures on the respective sides of the actuator. At step 507, the magnitude of the difference value is integrated over time to produce a trim value. At step 509, the trim value is applied to subsequent pressure values from opposing sides of the valve assembly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various

Having thus described the invention, it is claimed:

1. A hydraulic steering system comprising:
   a. an estimation module that estimates a trim value from at least an instantaneous backpressure value sensed on a valve assembly in a steering gear;
   b. and a compensation module that applies the trim value to pressure measurements sensed on the valve assembly.

2. The system of claim 1, wherein the instantaneous backpressure value is determined by comparing two pressure values sampled from at least two channels connected to opposing sides of the valve assembly.

3. The system of claim 1, wherein the pressure measurements include a subsequent instantaneous system pressure value and a subsequent instantaneous backpressure value.

4. The system of claim 1, wherein the estimation module estimates the trim value by comparing the subsequent instantaneous backpressure value to an average backpressure value computed over time.

5. The system of claim 4, wherein the average backpressure is computed by averaging a plurality of backpressure values, wherein the plurality of backpressure values includes backpressure values from the at least two channels connected to opposing sides of the valve assembly.

6. The system of claim 4, wherein the comparing comprises determining a difference between the instantaneous backpressure value and the average backpressure value.

7. The system of claim 6, wherein the difference is integrated to provide a trim value.

8. The system of claim 7, wherein the trim value is added to a subsequent instantaneous backpressure value if the instantaneous backpressure value is less than the average backpressure value.

9. The system of claim 8, wherein the trim value is subtracted from a subsequent instantaneous backpressure value if the instantaneous backpressure value is greater than the average backpressure value.

10. The system of claim 1, further comprising an enable module that selectively activates the compensation module when a system pressure is lower than a predetermined value and when rotations per minute (RPM) of an engine are greater than a base rotation value.

11. The system of claim 1, further comprising an enable module that determines a calibratable rate, wherein the estimation module uses the calibratable rate to integrate the trim value.

12. A method of compensating pressure in a hydraulic steering system, the method comprising:
    a. determining a first pressure value and a second pressure value from a pressure sensor connected to opposing sides of a valve assembly;
    b. selecting an instantaneous backpressure value from the first pressure value and the second pressure value;
    c. determining a difference value by subtracting the instantaneous backpressure value from an average backpressure value; and
    d. compensating a subsequent first pressure and a subsequent second pressure based at least in part on a trim value calculated with the difference value.

13. The method of claim 12, the difference value is integrated over time to produce the trim value.

14. The method of claim 12, the compensating further comprises adding the trim value to the subsequent first pressure when the subsequent first pressure is less than the average backpressure.

15. The method of claim 14, the compensating further comprises subtracting the trim value from the subsequent first pressure when the subsequent first pressure is greater than the average backpressure.

16. The method of claim 12, further comprising selectively enabling the compensating when the average backpressure value is less than a magnitude of a system pressure value but greater than an instantaneous backpressure value.

* * * * *